United States Patent [19]

Taylor

[11] Patent Number: 4,622,993

[45] Date of Patent: Nov. 18, 1986

[54] WELL PIPE FLOAT VALVE

[76] Inventor: Julian S. Taylor, 8300 SW. 8, Oklahoma City, Okla. 73128

[21] Appl. No.: 831,205

[22] Filed: Feb. 20, 1986

[51] Int. Cl.$^4$ ............................................. F16K 15/06
[52] U.S. Cl. ................................................... 137/542
[58] Field of Search ............... 137/542, 543.15, 516.29

[56] References Cited

U.S. PATENT DOCUMENTS 2,858,838  11/1958  Scaramucci ..................... 137/454.2
3,537,518  11/1970  Sullivan ..................... 137/543.15 X Primary Examiner—Robert G. Nilson
Attorney, Agent, or Firm—Robert K. Rhea

[57] ABSTRACT

In a plunger-type oil well pipe float valve assembly permitting well fluid flow in a downward direction by a valve stem supported valve seating and unseating on a valve seat, the valve stem reciprocates in a stationary valve stem guide sleeve which supports one end portion of a coiled expansion spring surrounding the valve stem and seated at its other end on a spring retainer adjacent the valve which normally biases the valve closed. Extensions are formed on the confronting end surfaces of the spring retainer and valve stem guide sleeve for inter-digitated engagement when fluid flow in a downward direction biases the valve open for preventing fluid stream induced angular rotation of the valve and its stem relative to the valve stem guide sleeve.

4 Claims, 2 Drawing Figures

WELL PIPE FLOAT VALVE

BACKGROUND OF THE INVENTION

1. Field of the invention.

The present invention relates to pipe float valves for use in lowering casing or drill pipe into a borehole in a rotary well drilling operation.

Float valves are ordinarily installed in the lowermost portion of a well casing string or the drill collar section immediately above a rotary drill bit. When used with drill collars the lower end portion of the drill collar bore is diametrically enlarged to accommodate the float valve which is held in place by the drill bit and accommodates the vertical reciprocating action of the valve in the float valve.

Float valves, as used with well casing and drill pipe, form several functions, such as providing a circulation path for well fluids from the casing or drill pipe to the annulus therearound; prevents back flow from the annulus into the casing or drill pipe of well fluids including displaced cement in a casing cementing job; provides a measure of blow-out prevention; and, floats the casing or drill pipe into the borehole thus using buoyancy to lighten the traveling block load and mass of the casing or pipe on the derrick. Additionally, the float valve, when operating properly in a drill pipe string, releases the drilling mud in the drill pipe borehole as the drill pipe is progressively removed from the borehole thus eliminating a spilling of drilling fluid on the rig floor and the workmen when pulling the drill pipe to replace the drill bit. A nonreturn check-type float valve is essential in all of the above described operations.

2. Description of the prior art.

The presently known and used casing and drill pipe float collars or valves usually comprise three types, a flapper or swing flap-type, a ball valve and a plunger valve.

The flapper in the flap-type valve is horizontally hinged for vertical pivoting movement and normally biased toward a closed position by a torsion spring offering a minimum resistance to flow.

The ball type float valve employs a cage and a free ball, as its closure element. The body of the valve is of two piece construction, one piece providing a sealing surface for the ball valve and a ball retention construction in the other portion. The ball valve is not normally spring loaded but may include an elastomer seal, the ball being biased by gravity to open position with resistance to flow being somewhat higher than the flapper valve.

The plunger type float valve is generally preferred and is superior in operating characteristics. The valve body provides a stop and seat for a valve stem mounted conical-shape valve spring biased closed by a compression spring surrounding the valve stem in which an elastomer surface insures a seal. This valve is opened by fluid flow forces in the free flow direction with movement of the plunger axially from its seat with the actual opening travel depending on the fluid flow forces and the spring constant.

The flapper valve offers substantially no constriction to flow while the ball and plunger types are approximately equal in pressure drop or obstruction to flow and are slightly higher than the flapper type. The contaminated-fluid resistance of the three valves are approximately equal. The flapper valve is capable of passing larger pieces of contaminant and all three types can be held partially open by contaminant trapped between the closing valve and the body or its seat, such leakage ultimately results in a cutting action and permanent damage to the valve.

U.S. Pat. No. 2,858,838 is an example of the presently used plunger type float valve which, as mentioned above, is the generally preferred float valve. The principal objection to the plunger type float valve is that in the open fluid passing position the well fluid under pump pressure generates angular rotation of the conical-shaped valve and its axial stem or shaft. Such rotation results in excessive wear on the valve stem and its sleeve-like valve stem guide which results in out of axial alignment of the valve and a failure to seal with its seat when biased toward a closed position.

This invention is an improvement over the plunger type float valve by providing means for arresting angular rotation of the valve in the float valve when in open position.

SUMMARY OF THE INVENTION

In a plunger type float valve comprising upper and lower spaced rings joined by diametrically opposed vertical wall members in which the upper ring forms a valve seat and the lower ring centrally supports a valve stem guide sleeve. A vertically movable valve, mounted on the upper end of a valve stem, seats and unseats on the valve seat by vertical sliding movement of the valve stem in the valve guide in response to fluid flow in respective directions. The valve is normally spring biased toward a closed position by a spring interposed between the valve stem guide and a spring seat surrounding the valve stem adjacent the valve. Depending diametrically opposite prongs are formed on the depending end of the spring retainer and upstanding circumferentially spaced lugs are formed on the upper end limit of the valve stem guide resulting in a tongue and groove configuration which prevents angular rotation of the valve when biased downwardly by fluid flow and the depending prongs upstanding lugs are cooperatively engaged.

The principal object is to provide an engaging and releasing tongue and groove joint on a valve stem guide and spring retainer in a plunger-type float valve for preventing angular rotation of the plunger valve by fluid flowing therethrough thus materially increasing the life and operating reliability of such float valves.

DESCRIPTION OF THE PREFERRED EMBODIMENT

Figures 1, 2:
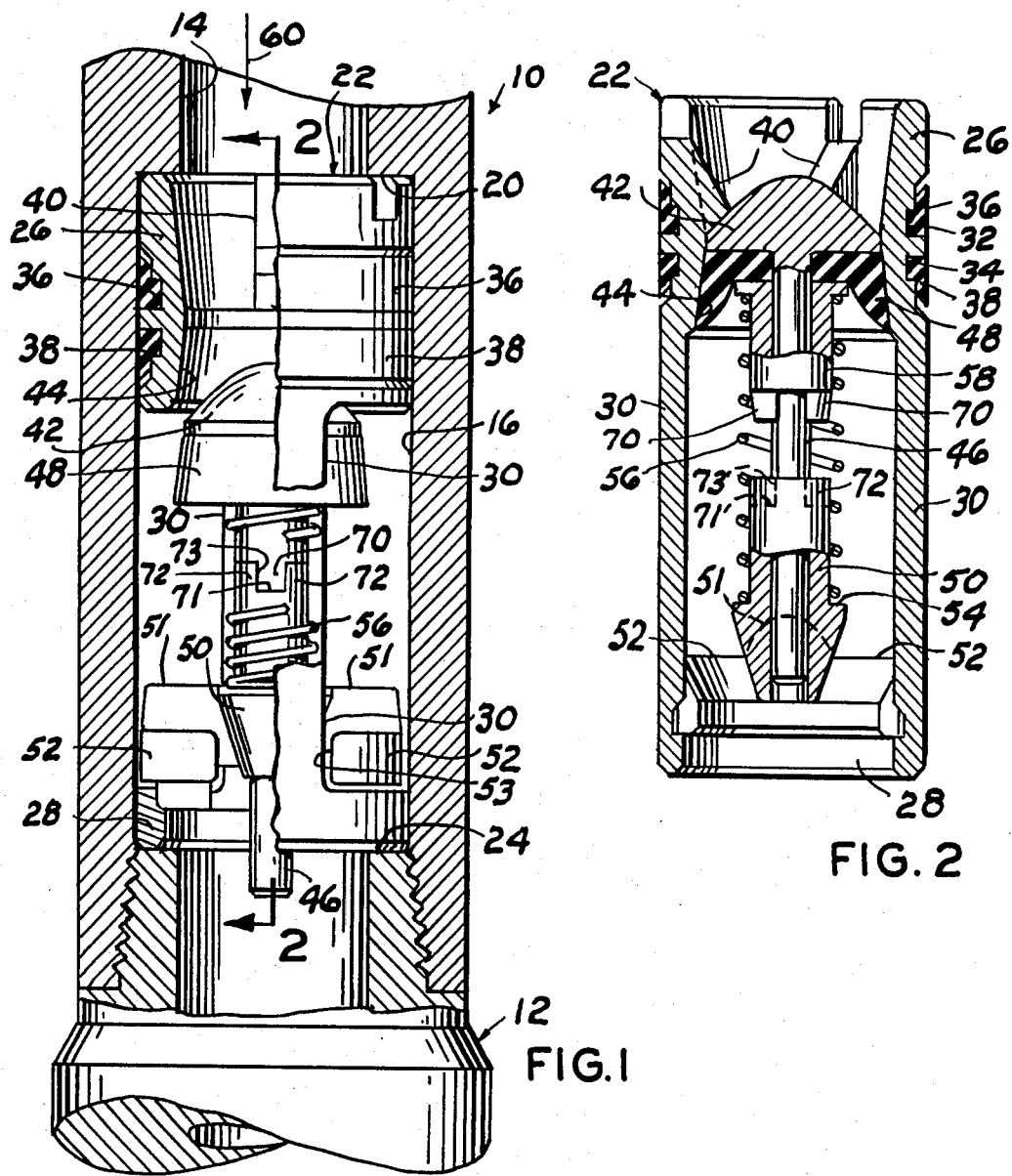
FIG. 1 is a fragmentary vertical cross sectional view, partially in elevation, of a drill collar and drill bit supporting a float valve in open flow position; and, FIG. 2 is a vertical cross sectional view of the float valve, per se, taken substantially along the line 2—2 of FIG. 1.

Like characters of reference designate like parts in those figures of the drawings in which they occur.

In the drawings:

The reference numeral 10 indicates the depending end portion of a drill collar threadedly connected with a drill bit 12 and having its bore 14 diametrically enlarged, as at 16, to define a downwardly facing shoulder 20.

The numeral 22 indicates a generally cylindrical float valve assembly adapted to be closely received by the drill collar counterbore 16 between the drill collar shoulder 20 and the inward end limit 24 of the drill bit.

The float valve 22 comprises upper and lower sleeve-like rings 26 and 28 integrally interconnected in vertically spaced relation by a pair of diametrically opposite bar-like wall members 30. Vertically spaced annular recesses 32 and 34 are formed in the periphery of the upper or top ring 26 for receiving wall seals 36 and 38, respectively. At its upper end portion the inner periphery of the top ring is provided with a plurality of inwardly directed circumferentially spaced stops 40 limiting the upward movement of a substantially cone-shaped valve 42. The top ring is further provided with a valve seat 44 facing downwardly from the stops 40.

The valve 42 is axially provided with a depending valve stem 46 extending between the upper and lower rings. An elastomer seal 48 surrounds the stem 46 adjacent the valve 42 for sealing engagement with the valve seat 44 at the upper limit of the valve 42.

A separable valve stem guide sleeve 50 surrounds the depending end portion of the valve stem 46 and includes a pair of opposing integral radial arms 51 connected at their respective ends with split ring members 52 in turn supported by the lower ring 28. The respective spaced-apart ends of the split rings loosely confront respective opposing sides of the float legs 30, as at 53 (FIG. 1), and stabilize the valve stem guide against angular rotation with respect to the lower ring 28.

The valve stem guide sleeve 50 includes an upwardly facing shoulder 54 which seats one end of a coiled compression spring 56 loosely surrounding the valve stem guide upper end portion and seating at its other end on the shoulder of a sleeve-like spring retainer 58 surrounding the upper end portion of the valve stem and abutting the adjacent surface of the elastomer seal 48.

As explained hereinabove, the spring 56 normally biases the valve 42 and its seal 48 toward sealing engagement with the valve seat 44 (FIG. 2). Fluid under pressure flowing down the drill pipe in the direction of the arrow 60, unseats the valve (FIG. 1) for drilling fluid circulation through the bore of the drill collar and drill bit.

The above described apparatus is fully disclosed by the above mentioned patent No. 2,858,838 and is set forth to show the combination on which the present invention is an improvement.

The spring retainer 58 in the above patent is relatively short in length when compared with the axial length of the valve stem guide sleeve 50 and is preferably extended, as shown by FIG. 2, to a length substantially equal to the length of the sleeve guide 50 and is provided on its depending end surface with diametrically opposite depending prongs 70 each having a transverse width less than the diameter of the valve stem 46. The length of the prongs is substantially equal with the width of the respective prong.

The upper end of the valve stem guide sleeve 50 is provided with diametrically opposite part-circular upstanding lugs 72 spaced-apart at their respective ends to form diametrically opposite grooves 73 substantially equal in width with the transverse width of the spring retainer depending prongs 70 for the purposes presently explained. The upstanding lugs 72 project above the valve stem guide top surface 71 a distance substantially equal to the length of the depending prongs 70.

OPERATION

In operation, assuming the float valve assembly 22 and drill bit equipped collar are assembled as described and have been lowered into a borehole, not shown. Drilling fluid, moving in the direction of the arrow 60, opens the float collar by unseating the valve (FIG. 1). The drilling fluid stream tends to angularly rotate the valve and its stem 46, however, the depending prongs 70 on the spring retainer are forced by the fluid pressure, against the valve 42, into the notches 73 and interdigitated engagement with the upstanding valve stem guide lugs 72 thus arresting rotation of the valve and its valve stem.

Obviously the invention is susceptible to changes or alterations without defeating its practicability. Therefore, I do not wish to be confined to the preferred embodiment shown in the drawings and described herein.

I claim:

1. In a drill pipe float assembly comprising an elongated cylindrical cage having upper and lower rings joined by diametrically opposite vertical wall members, said upper ring having a downwardly facing valve seat on its inner perimeter, a valve stem guide member supported by the lower ring including a central vertical bearing sleeve slidably guiding the depending end portion of a valve stem having a valve on its upper end including an elastomer seal seating and unseating on the valve seat in response to the direction of fluid flow through said ring members, a cylindrical spring retainer on the valve stem in contact with the valve seal, and a helical spring surrounding the valve stem and biasing the valve toward its seat, the improvement comprising:
    means secured to the respective confronting end surfaces of the spring retainer and the valve stem guide sleeve for interdigitated engagement in response to fluid flow in one direction through the float assembly.

2. The combination according to claim 1 in which the means comprises:
    circumferentially spaced lug means projecting upwardly from the upper end of said bearing sleeve for defining an upwardly open groove; and,
    prong means depending from the lower end of the spring retainer and cooperating with the lug means for preventing angular rotation of said valve with respect to said bearing sleeve when the valve is biased open.

3. The combination according to claim 2 in which the lug means includes:
    a pair of part circular lugs partially surrounding an adjacent portion of the valve stem.

4. The combination according to claim 3 in which the prong means includes:
    a pair of diametrically opposed prongs dimensioned for cooperative insertion into the spacing between the part circular lugs.

* * * * *